US012625783B2

(12) United States Patent
Cao

(10) Patent No.: US 12,625,783 B2
(45) Date of Patent: May 12, 2026

(54) SYSTEM AND METHODS OF MANAGING AND RECOGNIZING PCI DEVICES IN AN ACTIVE SYSTEM

(71) Applicant: STRATUS TECHNOLOGIES IRELAND LTD., Dublin (IE)

(72) Inventor: Lei Cao, Westford, MA (US)

(73) Assignee: STRATUS TECHNOLOGIES IRELAND LTD. (IE)

( * ) Notice: Subject to any disclaimer, the term of this patent is extended or adjusted under 35 U.S.C. 154(b) by 166 days.

(21) Appl. No.: 18/399,481

(22) Filed: Dec. 28, 2023

(65) Prior Publication Data

US 2025/0130969 A1 Apr. 24, 2025

Related U.S. Application Data

(60) Provisional application No. 63/545,153, filed on Oct. 20, 2023.

(51) Int. Cl.
*G06F 3/00* (2006.01)
*G06F 11/20* (2006.01)
*G06F 11/14* (2006.01)

(52) U.S. Cl.
CPC ........ *G06F 11/203* (2013.01); *G06F 11/2023* (2013.01); *G06F 11/2028* (2013.01); *G06F 11/2038* (2013.01); *G06F 11/2048* (2013.01); *G06F 11/2094* (2013.01); *G06F 11/1417* (2013.01)

(58) Field of Classification Search
CPC .............. G06F 11/203; G06F 11/2023; G06F 11/2038; G06F 11/2048; G06F 11/1417; G06F 11/2028; G06F 11/2094
See application file for complete search history.

(56) References Cited

U.S. PATENT DOCUMENTS

| | | | |
|---|---|---|---|
| 6,355,991 B1 | 3/2002 | Goff et al. | |
| 6,633,996 B1 | 10/2003 | Suffin et al. | |
| 6,687,851 B1 | 2/2004 | Somers et al. | |
| 6,691,225 B1 | 2/2004 | Suffin | |
| 6,691,257 B1 | 2/2004 | Suffin | |
| 6,708,283 B1 | 3/2004 | Nevin et al. | |

(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Kim T Huynh
(74) *Attorney, Agent, or Firm* — K&L GATES LLP

(57) ABSTRACT

In part, in one aspect, the disclosure relates to a method of enumerating a device relative to a computer system. The method may include sending, using a platform driver of an operating system (OS), a PCI memory range to self-enumeration (SE) firmware once it detects a new PCIe module; establishing a communication channel between the platform driver and SE firmware; detecting, using the platform driver, the new PCIe module via the PCI hotplug capability of the OS; and configuring a communication device, using the platform driver, on the PCIe module to establish a communication channel to the SE firmware. In some embodiments, the communication device is a synthetic device on the PCIe switch that allows low bandwidth bi-directional communication.

25 Claims, 2 Drawing Sheets

(56) References Cited

U.S. PATENT DOCUMENTS

| | | | |
|---|---|---|---|
| 6,718,474 B1 | 4/2004 | Somers et al. | |
| 6,766,413 B2 | 7/2004 | Newman | |
| 6,766,479 B2 | 7/2004 | Edwards | |
| 6,802,022 B1 | 10/2004 | Olson | |
| 6,813,721 B1 | 11/2004 | Tetreault et al. | |
| 6,842,823 B1 | 1/2005 | Olson | |
| 6,862,689 B2 | 3/2005 | Bergsten et al. | |
| 6,874,102 B2 | 3/2005 | Doody et al. | |
| 6,886,171 B2 | 4/2005 | MacLeod | |
| 6,928,583 B2 | 8/2005 | Griffin et al. | |
| 6,948,010 B2 | 9/2005 | Somers et al. | |
| 6,970,892 B2 | 11/2005 | Green et al. | |
| 6,971,043 B2 | 11/2005 | McLoughlin et al. | |
| 6,996,750 B2 | 2/2006 | Tetreault | |
| 7,065,672 B2 | 6/2006 | Long et al. | |
| 7,496,786 B2 | 2/2009 | Graham et al. | |
| 7,496,787 B2 | 2/2009 | Edwards et al. | |
| 7,669,073 B2 | 2/2010 | Graham et al. | |
| 7,904,906 B2 | 3/2011 | Puthukattukaran et al. | |
| 7,958,076 B2 | 6/2011 | Bergsten et al. | |
| 8,117,495 B2 | 2/2012 | Graham | |
| 8,161,311 B2 | 4/2012 | Wiebe | |
| 8,234,521 B2 | 7/2012 | Graham et al. | |
| 8,271,416 B2 | 9/2012 | Al-Biek et al. | |
| 8,312,318 B2 | 11/2012 | Graham et al. | |
| 8,381,012 B2 | 2/2013 | Wiebe | |
| 8,812,907 B1 | 8/2014 | Bissett et al. | |
| 9,251,002 B2 | 2/2016 | Manchek et al. | |
| 9,569,348 B1* | 2/2017 | Deming | G06F 12/00 |
| 9,588,844 B2 | 3/2017 | Bissett et al. | |
| 9,626,207 B2* | 4/2017 | Graham | G06F 9/45558 |
| 9,652,338 B2 | 5/2017 | Bissett et al. | |
| 9,760,442 B2 | 9/2017 | Bissett et al. | |
| 10,216,598 B2 | 2/2019 | Haid et al. | |
| 10,360,117 B2 | 7/2019 | Haid et al. | |
| 11,288,143 B2 | 3/2022 | Horvath et al. | |
| 11,586,514 B2 | 2/2023 | Pawlowski et al. | |
| 2001/0042202 A1 | 11/2001 | Horrath et al. | |
| 2002/0016935 A1 | 2/2002 | Bergsten et al. | |
| 2002/0070717 A1 | 6/2002 | Pellegrino | |
| 2003/0046670 A1 | 3/2003 | Marlow | |
| 2003/0095366 A1 | 5/2003 | Pellegrino | |
| 2006/0222125 A1 | 10/2006 | Edwards et al. | |
| 2006/0222126 A1 | 10/2006 | Edwards et al. | |
| 2006/0259815 A1 | 11/2006 | Graham et al. | |
| 2006/0274508 A1 | 12/2006 | LaRiviere et al. | |
| 2007/0011499 A1 | 1/2007 | Begsten et al. | |
| 2007/0028144 A1 | 2/2007 | Graham et al. | |
| 2007/0038891 A1 | 2/2007 | Graham | |
| 2007/0106873 A1 | 5/2007 | Lally et al. | |
| 2007/0174484 A1 | 7/2007 | Lussier et al. | |
| 2009/0249129 A1 | 10/2009 | Femia | |
| 2013/0159686 A1* | 6/2013 | Graham | G06F 9/5077 |
| | | | 713/1 |
| 2014/0115223 A1* | 4/2014 | Guddeti | G06F 13/404 |
| | | | 710/314 |
| 2015/0205688 A1 | 7/2015 | Haid et al. | |
| 2015/0220354 A1* | 8/2015 | Nair | C07K 16/2887 |
| | | | 710/308 |
| 2015/0242227 A1* | 8/2015 | Nair | G06F 9/45541 |
| | | | 718/1 |
| 2015/0263983 A1 | 9/2015 | Brennan et al. | |
| 2015/0293873 A1* | 10/2015 | Shao | G06F 13/404 |
| | | | 710/314 |
| 2017/0324609 A1 | 11/2017 | Hong et al. | |
| 2018/0046480 A1 | 2/2018 | Dong et al. | |
| 2018/0143885 A1 | 5/2018 | Dong et al. | |
| 2021/0034447 A1 | 2/2021 | Horvath et al. | |
| 2021/0034464 A1 | 2/2021 | Dailey et al. | |
| 2021/0034465 A1 | 2/2021 | Haid et al. | |
| 2021/0034483 A1 | 2/2021 | Haid | |
| 2021/0034523 A1 | 2/2021 | Dailey | |
| 2021/0037092 A1 | 2/2021 | Cao | |
| 2021/0208899 A1* | 7/2021 | Bornemann | G07C 5/08 |
| 2023/0185681 A1 | 6/2023 | Pawlowski et al. | |
| 2023/0291721 A1 | 9/2023 | Robinson | |
| 2024/0176739 A1 | 5/2024 | Alden et al. | |
| 2025/0130969 A1* | 4/2025 | Cao | G06F 11/2094 |
| 2025/0139048 A1* | 5/2025 | McKeone | G06N 20/00 |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

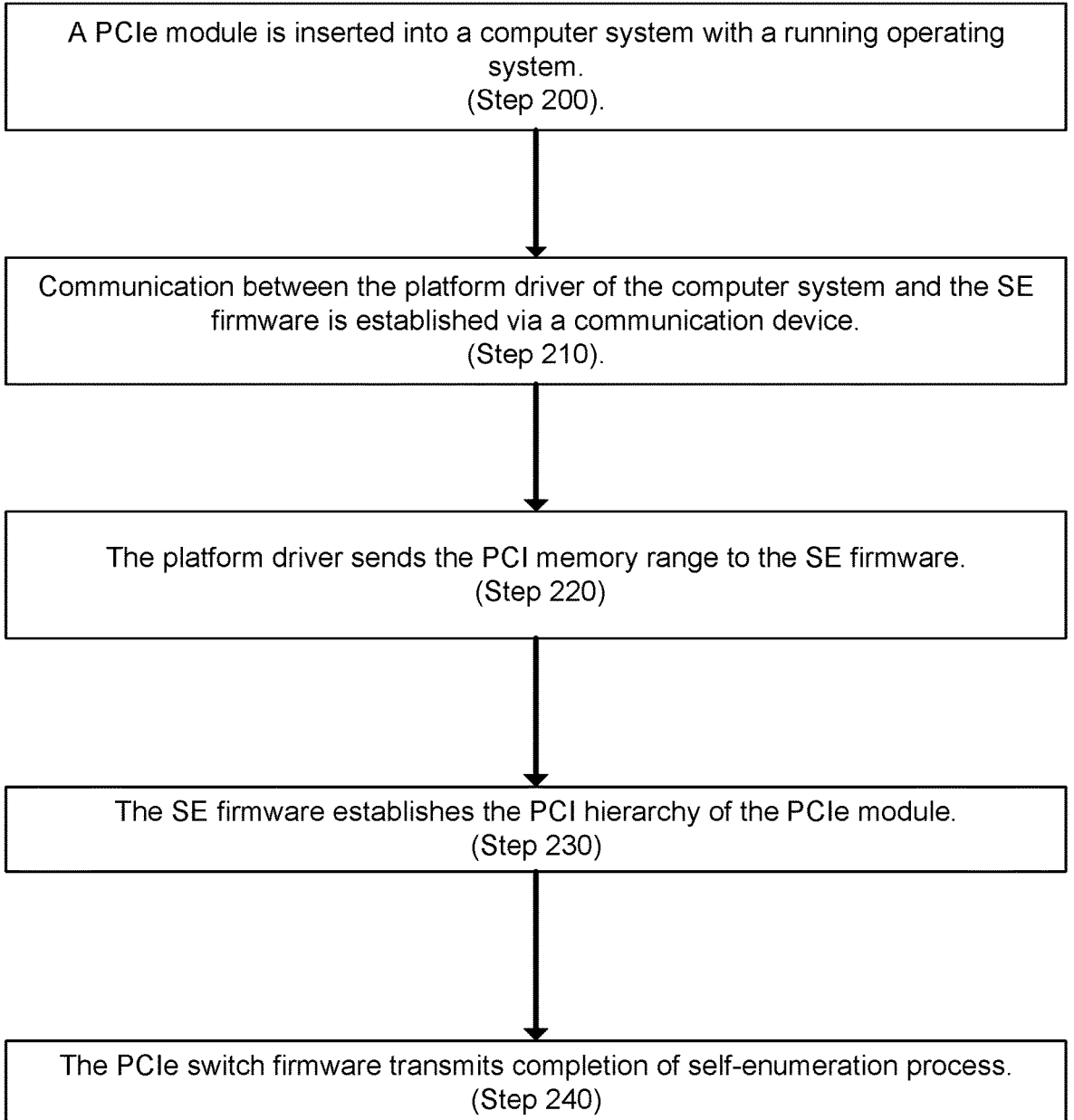

A PCIe module is inserted into a computer system with a running operating system.
(Step 200).

Communication between the platform driver of the computer system and the SE firmware is established via a communication device.
(Step 210).

The platform driver sends the PCI memory range to the SE firmware.
(Step 220)

The SE firmware establishes the PCI hierarchy of the PCIe module.
(Step 230)

The PCIe switch firmware transmits completion of self-enumeration process.
(Step 240)

FIG. 2

SYSTEM AND METHODS OF MANAGING AND RECOGNIZING PCI DEVICES IN AN ACTIVE SYSTEM

CROSS REFERENCE TO RELATED APPLICATIONS

This application is a U.S. patent application which claims priority to and the benefit of U.S. Provisional Patent Application No. 63/545,153, filed on Oct. 20, 2023.

FIELD

The disclosure relates generally to an architecture for a computer system and more specifically to device recognition and management between components of the computer system.

BACKGROUND

Various operating systems and computer systems lack features to support hot insertion of devices. The disclosure addresses some of the challenges associated with the lack of support for such features and others.

SUMMARY

In part, in one aspect, the disclosure relates to a method of enumerating a device relative to a computer system. The method may include sending, using a platform driver of an operating system (OS), a PCI memory range to self-enumeration (SE) firmware once it detects a new PCIe module; establishing a communication channel between the platform driver and SE firmware; detecting, using the platform driver, the new PCIe module via the PCI hotplug capability of the OS; and configuring a communication device, using the platform driver, on the PCIe module to establish a communication channel to the SE firmware. In some embodiments, the communication device is a synthetic device on the PCIe switch that allows low bandwidth bi-directional communication.

In part, in another aspect, the disclosure relates to a method of recognizing PCI devices in an active system. The method may include inserting a PCIe module in a first computer system running a first operating system; establishing a first communication channel between the first operating system and the PCIe module; transmitting a memory range from the first operating system to the PCIe module, the memory range includes a range of memory addresses of a first PCI bridge, wherein the PCIe module is in communication with the first PCI bridge; setting up a PCI hierarchy for the PCIe module, wherein the PCI hierarchy includes the first PCI bridge, one or more PCI bridges, and one or more PCI devices, wherein the one or more PCI devices are each connected to at least one of the first PCI bridge and the one or more PCI bridges; resetting connection between the first operating system and the PCIe module; and establishing a second communication channel between the first operating system and the PCIe module, the first operating system recognizing the PCI hierarchy in response to establishing a link to the PCIe module. In some embodiments, the link may be the second communication channel or another communication channel.

In some embodiments, the first operating system includes a platform driver. In some embodiments, the PCIe module includes a switch, wherein the switch includes switch firmware. In some embodiments, the first communication channel is established between the switch firmware and the platform driver. In some embodiments, the platform driver transmits the memory range to the switch firmware. In some embodiments, the switch firmware sets up the PCI hierarchy. In various embodiments, the method may include booting the switch firmware. In various embodiments, the method may include detecting which PCI bus of the first computer is connected to the PCIe module. In various embodiments, the method may include configuring one or more PCI bus registers of a communication device of the switch to allow the first operating system to detect the communication device. In some embodiments, the platform driver recognizes the communication device, wherein the first communication channel is established between the platform driver and the switch firmware using the communication device. In some embodiments, the first PCI bridge is a root bridge to which the switch is attached. In some embodiments, transmitting the memory range is performed by the platform driver, wherein the memory range is transmitted to the switch firmware.

In various embodiments, the method may include specifying a PCI configuration space of all bridges in the PCI hierarchy. In various embodiments, the method may include determining memory ranges for each PCI bridge on or connected to the switch using the memory range. In various embodiments, the method may include booting the switch firmware; obtaining a set of PCI bus numbers during boot; and determining a set of bus numbers of PCI bridges on the switch using the set of PCI bus numbers.

In some embodiments, setting up a PCI hierarchy for the PCIe module further includes writing values into PCI bus registers and PCI memory registers of the bridge, wherein the values include the memory ranges for each PCI bridge and the PCI bus numbers, respectively. In various embodiments, the method may include communicating, from the switch firmware to the platform driver, that completion of self-enumeration of the PCI hierarchy is complete.

In some embodiments, the step of resetting connection further includes the platform driver terminating link to the switch and then establishing the link to the switch. In various embodiments, the method may include bringing the PCI hierarchy and the PCI devices in the PCI hierarchy online using the first operating system. In some embodiments, the first operating system is Esx. In some embodiments, the first operating system lacks hot insertion functionality for PCI modules that include a hierarchy of PCI bridges and PCI devices. In some embodiments, one or more steps of the method are implemented on one or more compute nodes that include a PCI bridge on the PCIe module that is connected to a root port of the root bridge on the host system. In some embodiments, PCI devices on the PCIe module are connected to other PCI bridges on the PCIe module.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIG. 2 is a flow diagram of an embodiment of the steps of self-enumerating PCIe devices in accordance with the disclosure.

DETAILED DESCRIPTION

Figure 1:
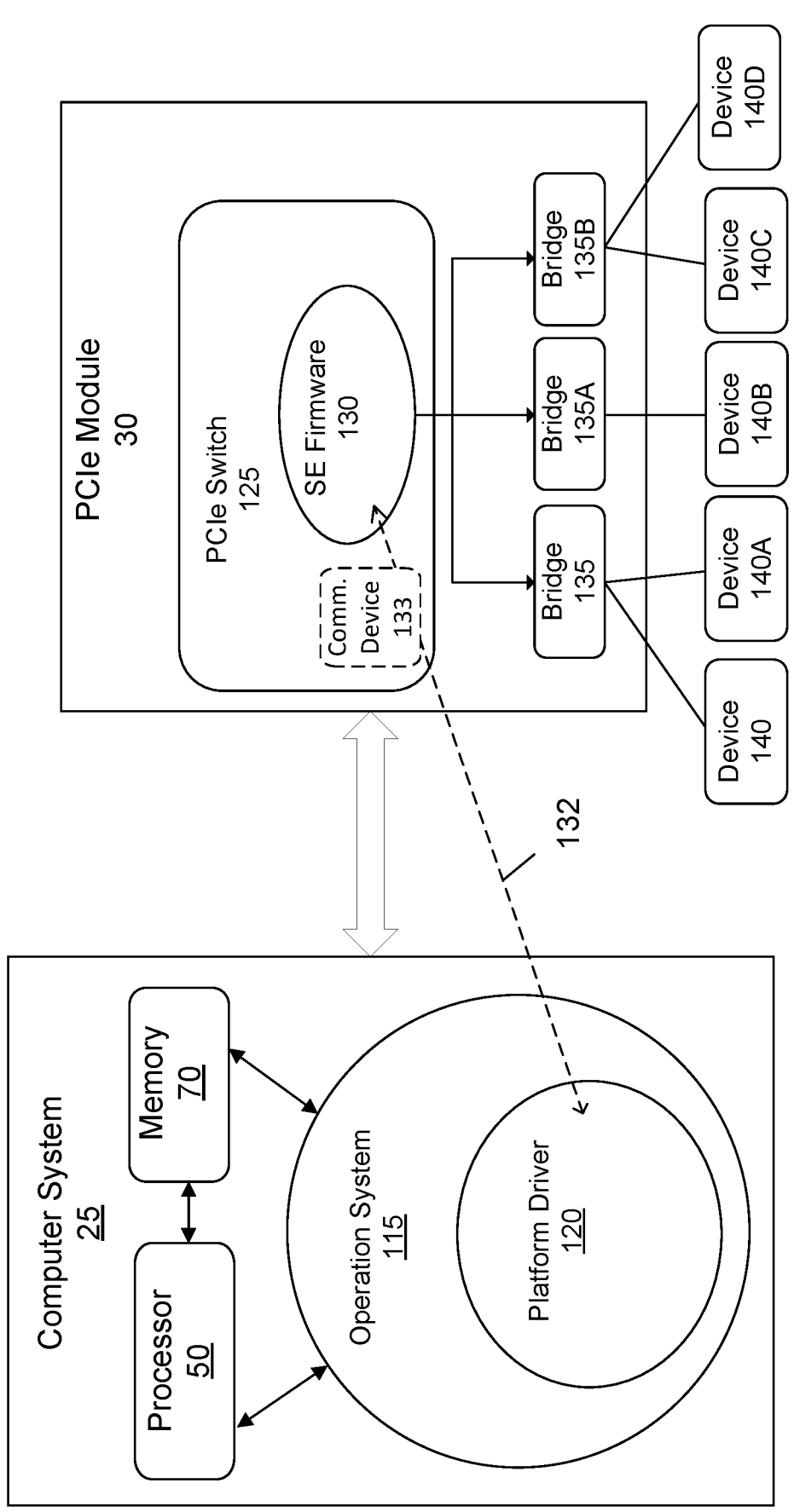
FIG. 1 is a block diagram of computer system and peripheral component interconnect express (PCIe) module in accordance with the disclosure.

Modern computer systems can have removable hardware modules such as PCIe modules that may include and releasably connect to PCIe switches and PCI devices. PCIe modules are desirable in various systems because they provide an interface for connecting high-speed input output (HSIO) components. Some operating systems do not support insertion of PCIe modules during run time, because they only support hot plug insertion of preconfigured PCIe devices. The disclosure provides a process in which PCI devices may be recognized or self-enumerated by computer hardware such as PCI modules and/or PCIe switches in the IO modules so that an operating system can recognize, use, and manage the PCI bridges and all the PCI devices connected in the running system. In various embodiments, the disclosure may support this functionality including device recognition and management even if the operating system does not support recognizing and managing device such as through a native hot plugging functionality or feature. Embodiments of the disclosure are suitable for use with operating systems that require preconfiguring of PCIe devices.

The system and methods of the disclosure applies generally to various computer systems including a high reliability fault tolerant computer system although that is not the only use case. In some embodiments, the disclosure provides modifications and workarounds to achieve hot plug support such as PCIe hot plug support with regard to operating systems, other software, and hardware that does not natively support such functionality or that require preconfiguring of PCIe devices for them to be detected and used. Some examples of operating systems that may not support hot plug support (or hot swapping of such devices) for PCI or PCIe devices may include Elastic Sky X (ESX), Elastic Sky X integrated (ESXi), Linux-based operating systems, virtualized operating systems, and others as may exist now or in the future that do not support hot plugging functionality or only support such functionality with various requirements such as device preconfiguration.

Refer now to the example embodiment of FIG. 1. FIG. 1 depicts a computer system 25 and a PCIe module 30 or other device interface hardware modules that are operably connected and configured to exchange data. In some embodiments, computer system 25 is part of a fault tolerant system that may include a second computer system that is substantially the same as computer system 25. The computer system 25 may include various components such as processor 50 and memory 70 and communication or data exchange channels and buses. The computer system 25 includes an operating system 115 with a platform driver 120. The platform driver is configured to support and perform one or more of the steps/operations described herein. In various embodiments, the operating system 115 runs or executes or exchanged threads or data with the processor 50 and stores and retrieves data from memory 70 such as random access memory. The computer system may also include or connect to other memory storage such as disks or disk arrays. Some of the disks may connects the computer system 25 by being connected to the PCIe module 30 or a dedicated storage module.

In many embodiments, the PCIe module 30 includes a PCIe switch 125 that include self-enumeration (SE) firmware 130 that manages the bridges 135, 135A, 135B. The firmware of a PCIe switch is modified, replaced and/or configured to perform the steps and respond to the changes described herein relating to self-enumeration such as by including self-enumeration code and/or instructions. These bridges are PCIe bridges in various embodiments and are generally referred to as such herein. In some embodiments, other bridges that support peripherals or other devices used by a computer system or other hardware may be used. Each PCIe bridge 135 may communicate with one or more PCIe devices 140, 140A, 140B, 140C, 140D. In various embodiments, the PCIe module 30 and its components may be implemented using one or more chipsets that are in electrical communication with the processor 50 and memory 70 and other hardware components and buses that connect to a motherboard or other hardware of the computer system 25. The platform driver 120 may handle various data exchanges between the kernel of the operating system 115 and other steps and operations as described herein. In many embodiments, a PCI bridge on the PCIe module is connected to a root port of the root bridge on the host system. Similarly, in many embodiments, PCI devices on the PCIe module are connected to other PCI bridges on the PCIe module.

In various embodiments, the hardware, software, and firmware components of the computer system 25 and PCIe module 30 may be communicably and operatively coupled to each other using buses, communication channels, data channels and other connections or links as shown by the double-headed arrows, single headed arrows, and straight line connection all of which may support transmitting, receiving, and exchanging of data, values, signals, instructions, messages, and similar hardware-based and software-based communications.

The disclosure may support various hot plugging scenarios by coordinating various device recognition or enumeration steps between a platform driver running in the kernel of the operating system and the PCIe switch firmware running on the PCIe module. In various embodiments the computer system 25 boots and the operating system loads the platform driver 120. In many embodiments, the platform driver is a kernel level driver or kernel driver. Once the operating system is running, the PCIe module 30 may be inserted into the running computer system 25. The PCIe switch firmware 130 will boot. Next, a communication channel 132 will be established between the operating system and the computer system As part of the process, in some embodiments, the PCIe switch firmware 130 will detect the PCI bus it is on. Once detected, the PCIe switch firmware 130 will set up the PCI bus registers of its communication devices (which may be communication device 133 discussed below), which allows the PCIe module 30 to be detected by the operating system 115. The operating system 115, or more specifically, the platform driver 120 can then establish a communication channel 132 with the PCIe switch firmware over the communication device. The communication channel 132 may also be referred to a link or datapath.

In some embodiments, to facilitate self-enumeration, the platform driver sends the PCI memory range to the SE firmware once it detects the presence of a new PCIe module. A communication channel 132 is established between the platform driver 120 and SE firmware 130. In various embodiments, this channel 132 may be established using a comm. device 133, such as a synthetic communication device of PCIe switch 125. In turn, the platform driver will detect the presence of a new PCIe module via the PCI hotplug capability of the OS. Once detected, the platform driver will configure a communication device on the PCIe module to establish a communication channel to the SE firmware. In various embodiments, the communication device 133 is a synthetic device on the PCIe switch that allows low bandwidth bi-directional communication.

Once a communication channel is established, the platform driver 120 sends the PCI memory range of the root bridge of the PCIe 125 switch to the PCIe switch firmware 130. In various embodiments, the root bridge is actually on the host system. A PCI root bridge (or complex) connects the CPU and memory to the PCI subsystem. The root bridge has multiple root ports. The new PCIe module that is being hot inserted is plugged into a root port.

In some embodiments, the root bridge is a hardware component such as an ASIC or chipset that creates a PCI bus that serves as the primary or physical parent bus for a set of device that share a common PCI interface for inputs and outputs and a common PCI memory and configuration space. In some embodiments, the computer system 25 and/or the module 30 may include or connect to a PCI host bus controller that includes one or more PCI root bridges. In various embodiments, each PCI root bridge corresponds to a local PCI bus that may include devices on the PCI slots of the PCIe module or other hardware. In many embodiments, one or more root ports connect to a given root bridge and have the most direct path to the root bridge.

Using the PCI memory range of the root port, the PCIe switch firmware 130 calculates the memory ranges of the PCI bridges 135 on the PCIe switch 125. The relevant calculation is not a standard feature and implemented as part of the enumeration processes disclosed herein. In some embodiments, the PCI bridges within the new PCIe module have predefined memory sizes, so given the memory range of the entire PCIe module, the systems, methods and devices disclosed herein are able to calculate the memory range of each PCI bridge based on its position in the PCI hierarchy. These calculations/enumerations are usually performed by the OS hotplug logic. However, certain OS do not support enumeration of a PCIe module which includes a hierarchy of PCIe devices. In part, this creates the need for self-enumeration by the PCIe switch firmware on the PCIe module that the present disclosure addresses in some embodiments.

Using the PCI bus number obtained when the PCIe module booted, the PCIe switch firmware 130 also calculates the bus numbers of the PCI bridges 135 on the PCIe switch 125. The PCIe switch firmware 130 then sets ups the PCI configuration spaces of all the PCI bridges 135 by writing the calculated values into the PCI bus registers and PCI memory registers of the bridges. This substantially completes the self-enumeration processes. The PCIe switch firmware 125 then transmits to the operating system 115 or platform driver 120 that self-enumeration is completed. The platform driver 120 resets the communication channel between the computer system 25 and the PCIe Module 30 such that it can be configured to the PCIe switch 125. In some embodiments, the operating system 115 detects a new hierarchy of PCI bridges 135 that have already been enumerated by the PCIe switch firmware. The operating system brings the PCI bridges 135 and the PCI devices 140 online.

Refer now to the example embodiment of FIG. 2. FIG. 2 depicts a flow diagram of a process in accordance with the disclosure. The disclosure is applicable to a running computer system that has already booted its operating system and running the appropriate drivers. A PCIe module is then inserted into the computer system (Step 200). Upon insertion, the PCIe switch firmware of the PCIe module will boot. The Communication between the platform driver of the computer system and the SE firmware is established via a communication device (Step 210). In various embodiments, establishing communication requires a communication device on the PCIe module. First, the PCIe switch firmware detects the PCI bus it is on, and establishes the PCI bus registers of one of its communication devices. This allows the detection of the communication device/PCIe module by the operating system of the computer system. Through this communication device, the operating system and the PCIe switch firmware can establish a communications channel. The platform driver sends the PCI memory range to the SE firmware' (Step 220).

Next, the SE firmware establishes the PCI hierarchy of the PCIe module (Step 230). In various embodiments, this step is completed by the PCIe switch firmware or other instructions, logic, firmware, or software. The PCIe switch firmware calculates the memory ranges of the PCI bridges on the PCIe switch using the memory range received from the operating system. The PCIe switch firmware can also calculate the bus number of the PCI bridges on the PCIe switch based on the PCI bus number it obtained when booted. Based on these calculations, the PCIe switch firmware can establish the PCI configuration spaces of all the PCI bridges by writing the values it calculated into the PCI bus registers of the PCI bridges. This completes the self-enumeration process.

In various embodiments, upon the completion of the self-enumeration process, the PCIe transmits a completion message to the operating system (step 240). The operating system will reset the communication channel. Upon reconnection, the operating system will detect the hierarchy of PCI bridges that have been enumerated. The operating system can then bring the PCI bridges and devices online for the computer system.

Some of the embodiments disclosed herein may be used with fault tolerant systems that have a modular design that allows components to be replaced or for one or more components to take over for other components when a failure or error is detected that could impair the operation of one computer system or one or more devices used thereby. To accomplish high reliability in some fault tolerant computer systems frequently have redundant components such that when one component fails, begins to fail, or is predicted to fail, the programs using the failing computer component instead use a similar but redundant component of the system.

To minimize or reduce downtime or other adverse effects for an end user, fault tolerant computer systems often have migration and failover capabilities. Modern computer systems also make use of high-performance peripherals that communicate through a PCIe ports. However, not all operating systems recognize PCIe modules that are inserted at run time due to the operating systems limitations. This can result in failure during live migration or failover processes in fault tolerant computer systems. In light of the foregoing, various embodiments of the disclosure may support device recognition, enumeration, and/or management in a hot swap scenario such as one a PCI device is failing or fails and a replacement needs to be added. Also, in many various embodiments of the disclosure may support device recognition, enumeration, and/or management as part of a live migration one computer system is failing and a secondary system is running to take over for the primary system. The present disclosure offers various advantages with regard to fault tolerant computing and fault tolerant systems. The ability to replace a PCIe module when the system is running is important for fault tolerant operations. In addition, PCIe module replacement generally will not work with certain OS without self-enumeration such as the methods and devices and configurations disclosed herein.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the disclosure. The examples are intended primarily for purposes of illustration of the disclosure for those skilled in the art. No particular aspect or aspects of the examples are necessarily intended to limit the scope of the disclosure.

The figures and descriptions of the disclosure have been simplified to illustrate elements that are relevant for a clear understanding of the disclosure, while eliminating, for purposes of clarity, other elements. Those of ordinary skill in the art may recognize, however, that these sorts of focused discussions would not facilitate a better understanding of the disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the disclosure, a single component may be replaced by multiple components, and multiple components may be replaced by a single component, to perform a given function or functions. Except where such substitution would not be operative to practice embodiments of the disclosure, such substitution is within the scope of the disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PUP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the disclosure based on the description herein with only a reasonable effort and without undue experimentation.

In some embodiments, a host system is a compute node that provides services to users or other computers on that network. Host system may run a virtualized and/or a multi-user operating system such as Unix, Linux, or at least an operating system with network services such as Windows or other real-time operating systems.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within 20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of recognizing Peripheral Component Interconnect (PCI) devices in an active system, the method comprising:

inserting a Peripheral Component Interconnect Express (PCIe) module in a first computer system running a first operating system, wherein the first operating system lacks support for hot plug insertion of a PCI device;

establishing a first communication channel between the first operating system and the PCIe module;

transmitting a memory range from the first operating system to the PCIe module, the memory range comprising a range of memory addresses of a first PCI bridge, wherein the PCIe module is in communication with the first PCI bridge;

setting up a PCI hierarchy for the PCIe module, wherein the PCI hierarchy comprises the first PCI bridge, one or more PCI bridges, and one or more PCI devices, wherein the one or more PCI devices are each connected to at least one of the first PCI bridge and the one or more PCI bridges;

resetting connection between the first operating system and the PCIe module; and establishing a second communication channel between the first operating system and the PCIe module, the first operating system recognizing the PCI hierarchy in response to establishing a link to the PCIe module.

2. The method of claim 1, wherein the first operating system comprises a platform driver, wherein the platform driver is a kernel mode driver.

3. The method of claim 2, wherein the PCIe module comprises a switch, wherein the switch comprises switch firmware.

4. The method of claim 3, wherein the first communication channel is established between the switch firmware and the platform driver.

5. The method of claim 3, wherein the platform driver transmits the memory range to the switch firmware.

6. The method of claim 5, wherein the switch firmware sets up the PCI hierarchy.

7. The method of claim 3 further comprising booting the switch firmware.

8. The method of claim 7 further comprising detecting which PCI bus of the first computer is connected to the PCIe module.

9. The method of claim 7 further comprising configuring one or more PCI bus registers of a communication device of the switch to allow the first operating system to detect the communication device.

10. The method of claim 9, wherein the platform driver recognizes the communication device, wherein the first communication channel is established between the platform driver and the switch firmware using the communication device.

11. The method of claim 3, wherein the first PCI bridge is a root bridge to which the switch is attached.

12. The method of claim 11, wherein transmitting the memory range is performed by the platform driver, wherein the memory range is transmitted to the switch firmware.

13. The method of claim 12 further comprising specifying a PCI configuration space of all bridges in the PCI hierarchy.

14. The method of claim 12 further comprising determining memory ranges for each PCI bridge on or connected to the switch using the memory range.

15. The method of claim 12 further comprising booting the switch firmware; obtaining a set of PCI bus numbers during boot; and determining a set of bus numbers of PCI bridges on the switch using the set of PCI bus numbers.

16. The method of claim 15, wherein setting up a PCI hierarchy for the PCIe module further comprises writing values into PCI bus registers and PCI memory registers of the bridge, wherein the values comprise the memory ranges for each PCI bridge and the PCI bus numbers, respectively.

17. The method of claim 15 further comprising communicating, from the switch firmware to the platform driver, that completion of self-enumeration of the PCI hierarchy is complete.

18. The method of claim 3, wherein step of resetting connection between the first operating system and the PCIe module further comprises the platform driver terminating link to the switch and then establishing the link to the switch.

19. The method of claim 3 further comprising bringing the PCI hierarchy and the PCI devices in the PCI hierarchy online using the first operating system.

20. The method of claim 1, wherein the first operating system is Elastic Sky X (ESX).

21. The method of claim 1, wherein one or more steps of the method are implemented on one or more compute nodes that comprise a PCI bridge on the PCIe module that is connected to a root port of the root bridge on the host system.

22. The method of claim 21, wherein PCI devices on the PCIe module are connected to other PCI bridges on the PCIe module.

23. A method of enumerating a device relative to a computer system, the method comprising:

inserting a new Peripheral Component Interconnect Express (PCIe) module in a first computer system running a first operating system (OS), wherein the OS requires preconfiguring of a PCIe device to support hot plug insertion of the PCIe device;

sending, using a platform driver of the OS, a PCI memory range to self-enumeration (SE) firmware once it detects the new PCIe module, wherein the platform driver is a kernel mode driver;

establishing a communication channel between the platform driver and SE firmware, wherein the PCIe module comprises the self-enumeration (SE) firmware;

detecting, using the platform driver, the new PCIe module; and configuring a communication device, using the platform driver, on the PCIe module to establish a communication channel to the SE firmware.

24. The method of claim 23, wherein communication device is a device that allows bi-directional communication.

25. The method of claim 24, wherein the PCIe module comprises a PCIe switch, wherein the PCIe switch further comprises the SE firmware.

* * * * *